United States Patent Office 3,827,985
Patented Aug. 6, 1974

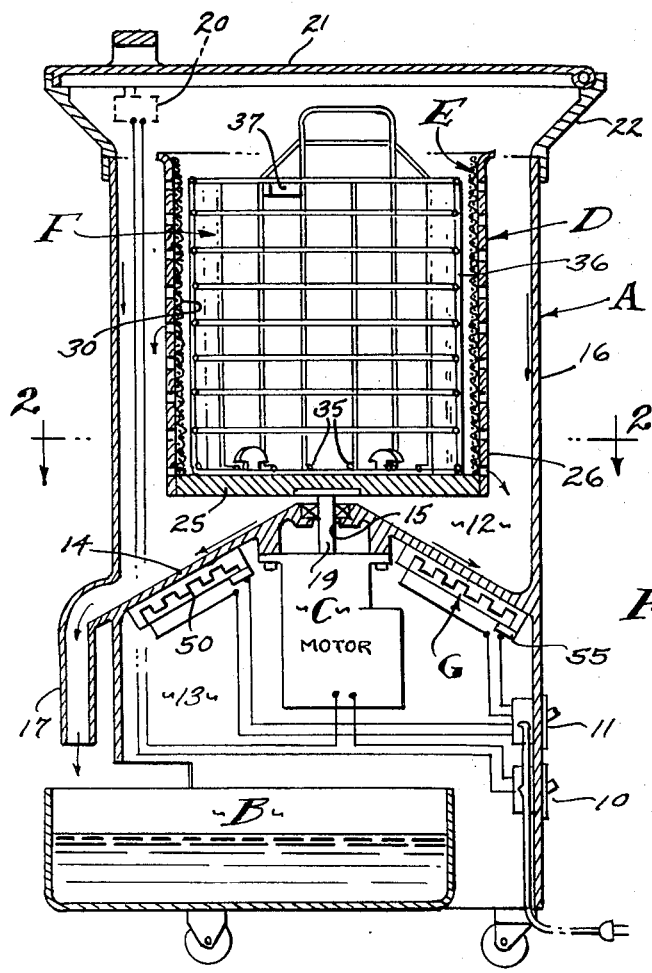
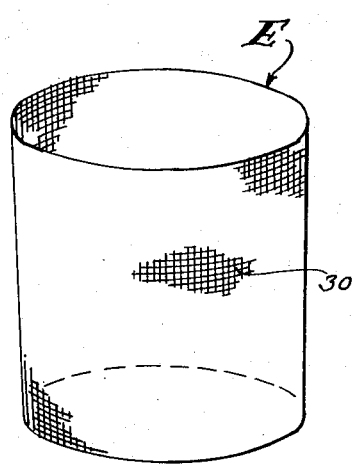
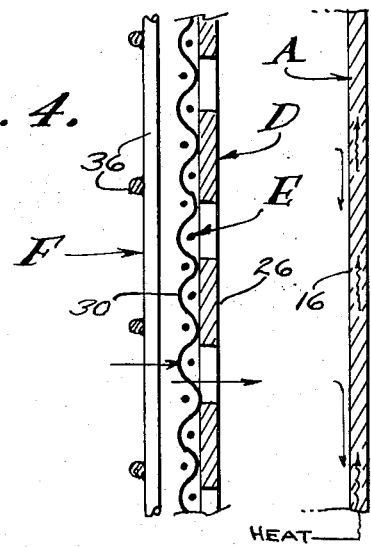
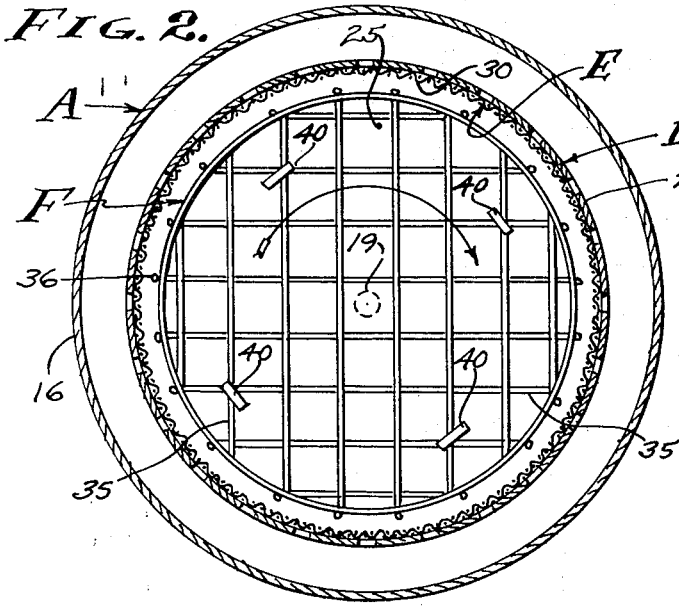
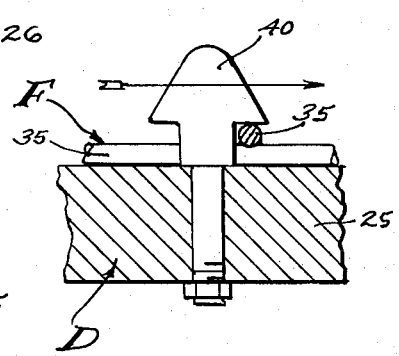

3,827,985
GREASE EXTRACTOR
Michael De Haan, Sherman Oaks, and Lawrence Cohen, Los Angeles, Calif. (both of 1610 Meadows Drive, Portland, Oreg. 97034)
Filed Oct. 16, 1972, Ser. No. 297,744
Int. Cl. B01d 21/26
U.S. Cl. 210—179                              13 Claims

ABSTRACT OF THE DISCLOSURE

A heated centrifuge with removable filtering baskets for the processing of batches of grease laden materials in order to extract said grease therefrom. The centrifuge is motor driven at moderate speeds when used for the intended purpose of removing excess grease from prepared foods, and loose or foreign particles are separated from the grease and which is reclaimed at moderate temperatures while assuring immediate flow and collection within a basin.

BACKGROUND

The preparation of large quantities of food ready for serving becomes involved and costly when fats and oils are included. Reference is made to cooking methods that require frying and especially deep frying, such as for example the deep frying of poultry previously dipped in a batter. This fried food, and others of similar character, are necessarily dripping with fat or oil and/or grease upon emergence from the deep fry pot or kettle, whereupon it is customary to remove them to an environment where the excess fats, oils and grease drop and/or precipitate therefrom. Said precipitation has been time consuming and inefficient, with the retention of excessive amounts of grease within the food product. In practice for example, poultry prepared by deep frying is temporarily stored in warming ovens and upon racks superimposed over trays therein which collect the "cracklings" and grease that drop and precipitate from the prepared bodies of food. Heretofore, these droppings and precipitation of liquid congeal, solidify and adhere to the racks and trays, and they are subsequently stripped therefrom and collected in a heated kettle for rendering preparatory to the making of gravy and/or to reclaim the grease for reuse. It will be recognized that fats, oils and grease that are subjected to heat, especially repeated subjections to high heat, become unsuitable for subsequent cooking. Therefore, it is an object of this invention to provide a grease extractor that is suitable for handling soft delicate bodies such as food portions, to substantially degrease the same in a low heat environment.

FIELD OF INVENTION

In view of the foregoing, the preparation of foods such as poultry that are deep fried is conducted by immersing whole parts of the fowl, covered with batter, into hot oil. The said whole parts of food form a batch that is customarily contained in a wire basket of cylindrical shape having a closed bottom and an open top. The basket is usually provided with an upwardly projecting handle (as shown) and the basket and its food content is immersed into a kettle filled with heated oil; this method of cooking being known as deep frying. And, it is therefore an object of this invention to advantageously employ these food baskets as the carrier common to the aforementioned deep fry equipment and to the grease extractor hereinafter disclosed. With the present invention, the food baskets are employed in the transport of the food parts from the deep frying equipment to the instant grease extractor and subsequently to the warming ovens where said food parts are dispersed upon trays.

The cooking kettles or deep fry pots into which the food baskets are immersed, and also the tray loaders onto which the prepared foods are dispersed, are counter height (more or less) units of equipment, and it is an object of this invention to provide a compatible counter height grease extractor adapted to receive the transfer of said food baskets from said deep fry pots to the storage trays into which the prepared foods are loaded. With the present invention, the deep fry food parts are degreased before placement upon the storage trays, and consequently the said trays (racks included) remain substantially clean during storage in the warming ovens awaiting ultimate dispensing to the customer or the like. That is, the food preparation is complete upon extraction of the food parts from the baskets removed from the instant grease extractor.

It is an object of this invention to provide for grease filtration at the point of greatest reaction established by the centrifuge action generated by the machine. With this invention, the filter element is a removable and/or replaceable cylinder liner that engageably restrains outward movement of the body being degreased and that collects foreign particles such as cracklings of deep fried foods, and any and all food particles that break away from the whole parts; and all of which are substantially degreased.

It is still another object of this invention to provide a degreaser that is operative at low heat to effectively collect grease in a basin. With this invention, there is a rotating cylinder into which the food baskets are driveably inserted, and all of which is protectively confined within a drum-housing. In accordance with this invention, the drum-housing is moderately heated to a temperature that fluidizes the fat and/or grease. It is the bottom and side walls of the drum that are heated, so that the discharge of grease from the rotating food baskets and cylinder remain fluid and descend by action of gravity to the basin for collection.

DRAWINGS

The various objects and features of this invention will be fully understood from the following detailed description of the typical preferred form and application thereof, throughout which description reference is made to the accompanying drawings, in which: FIG. 1 is a vertical sectional view taken through the grease extractor of the present invention. FIG. 2 is an enlarged sectional view taken as indicated by line 2—2 on FIG. 1. FIG. 3 is a perspective view of the filtration cylinder removed from the structure of FIG. 1. FIG. 4 is an enlarged fragmentary view showing the relationship of the basket, the filtration cylinder and centrifuge walls, and FIG. 5 is an enlarged detailed sectional view showing the drive lugs which characterize the present invention.

PREFERRED EMBODIMENT

The grease extractor disclosed herein cooperatively employs centrifugal action, filtration and heat; all with moderation commensurate with the delicate or fragile nature of the food products which are intended to be degreased thereby. In practice therefore: The centrifuge force necessary for effective results is of a low magnitude and which requires but minimal speeds in the range of one thousand r.p.m. when employing a mean (nominal maximum) diameter of twelve inches; the filtration particle size to be restrained is readily controlled and separation of fluids obtained at the most effective means (nominal maximum) diameter of the centrifuge; and the heat required for fluidity is nominal, the usually acceptable requirement of reduction of food bodies by means of rendering with extreme heat being virtually unnecessary and eliminated. To these ends therefore, the present invention involves, generally, a drum or housing A, a grease collector B, a drive means C, a centrifuge cylinder D, a filter E, a removable basket F, and a heating means G. The drum or housing A is an erect structure that carries and protectively encloses the operative elements and separates the centrifuge cylinder D, filter E and removable basket F from the grease collector B, drive means C and heating means G. The machine comprised of the foregoing elements is powered, preferably by electricity that is applied through a power cord and suitable on-off controlled switches 10 and 11 as shown.

The drum or housing A is preferably a vertically disposed right cylinder with upper and lower chambers 12 and 13 separated by a diametrically disposed wall 14 intermediate the upper and lower ends of the cylinder. The said upper and lower ends are essentially open as shown and the wall 14 is upwardly tapered and cone-shaped, being imperforate except for a bearing-shaft opening 15 at its apex. The periphery of wall 14 is integral with the outer diameter wall 16 of the housing A, in a plane spaced substantially above the lowermost floor supported end of the housing. In practice, the housing A is supported by spaced casters as is indicated.

The grease collector B can vary widely in form and is shown as a removable drawer or bin in the form of a vessal that receives the grease by gravity from a downspout 17 that depends from the peripheral connection of wall 14 with wall 16. In practice, the spout 17 remains open, although it can be valve controlled if so desired.

The drive means C is a motor drive which turns a shaft 19 that is journaled to revolve through the opening 15 on the central vertically disposed axis of the housing A. As shown, a geared head electric motor is employed with suitable seals at said opening 15 and under control of a normally open safety switch 20 closed by closure of a protective lid 21 which is hinged to and is manually operable to cover the housing A at its upper open end. The said lid 21 is hinged to an adapter 22 which is disposed at counter height. The switch 20 is in series with a switch 10 for joint control of the motor operation.

In accordance with this invention, the drive means C involves a drive wheel or flange 25 disposed above the wall 14 and fixed to shaft 29 so as to revolve within the chamber 12. In practice, the flange 25 forms the bottom of the centrifuge cylinder D, said bottom-flange being imperforate. The centrifuge cylinder D involves said bottom-flange 25 to support and carry a vertically disposed peripheral wall 26 that extends upwardly from the outer circumference of said flange. The wall 26 is perforated throughout and is concentric with the rotational axis of shaft 19. The diameter of the peripheral wall 26 is less than that of the housing wall 16 leaving an annulus therebetween to receive the discharge of grease emanating through the perforated wall. As shown, the upper end of the centrifuge cylinder is open and there is no discharge through the imperforate bottom-flange 25.

The filter E is a removable and/or expendable element as circumstances require, and in any case there is an open ended cylinder of tube form that rises within the confines of the centrifuge cylinder D. In practice, the filter E is a replaceable screen 30 as is shown; or it can be a liner of spaced fibers, such as a filter paper or cloth. Accordingly, the screen 30 is coextensive with and has interface supporting engagement upon the inner diameter side wall 26 and it is adapted to slide into and out of position into the top open end of the centrifuge cylinder D; to be cleaned and/or replaced as the case may be.

The basket F is a food basket in the particular example given, and it is preferably of an open rod or wire mesh. As is clearly indicated, the basket F is of right cylinder form adapted to slideably drop into position in the centrifuge cylinder D and within the confines of the filtration screen or liner 30. The basket F characterized by its apertured bottom is of criss-cross wire formation comprised of normal transversely related bottom members 35 and circumferentially and vertically related side members 36. The bottom of basket F comprised of the right angularly related members 35 is adapted to supportably lie against the top face of the bottom flange 25 of centrifuge cylinder D. The said members 35 are arranged in a concentrically symmetrical pattern comprised of equally spaced members 35 disposed in the two right angularly related directions, as shown. Several of the vertically disposed side members 36 extend upwardly so as to form a handle; and it is these baskets which are used to handle the food parts that are deep fried therein and subsequently transported thereby through the processing performed within the centrifuge cylinder D. A counter balance 37 (indicated) counteracts the weight of the extended handle.

In accordance with the invention, the basket F is driven by drive lugs 40 that project upwardly from the supporting face of the bottom-flange 25, engaging through the openings formed by the crossed wire mesh thereof.

There is a multiplicity of drive lugs 40 arranged in equally spaced circumferential relation in a pattern concentric with the axis of rotation. The drive lugs 40 are positioned to simultaneously engage the diametrically opposed bottom members 35 (on equal radii) respectively and are headed or shouldered so as to extend circumferentially in opposite directions in order to overlie said members of the wire basket mesh through which it penetrates. Thus, rotational shifting of the basket relative to the bottom-flange 25 causes an overlying or hooked engagement and which inherently occurs reversely with the application of acceleration and deceleration forces. This overlying engagement assures capture of the basket and prevents accidental lifting of the same from the centrifuge cylinder D.

The heating means G is provided to permeate the body of housing A with warmth sufficient to assure fluidity of the grease discharged from the centrifuge cylinder D. In accordance with the invention, low heat electrical heaters 50 are placed across the underside of wall 14 to heat the same. The heat generated beneath wall 14 is absorbed thereby and is transmitted into the side wall 16 of the housing. The heat level is minimized by one or more thermostat switches 55 to the level which will prevent congealing and/or solidification of the fatty discharge which is then carried by gravity to the grease collector B. It will be seen that, with the exception of the filtering means E, the machine is self-cleaning and that a maximum high yield of grease is inherent.

Having described only a typical preferred form and application of our invention, we do not wish to be limited or restricted to the specific details herein set forth, but wish to reserve to ourselves any modifications or variations that may appear to those skilled in the art.

We claim:

1. An extractor for removing fluid grease and the like from whole bodies of delicate substances and including: a vertical housing with a diametrically disposed wall forming an upwardly opening fluid collecting chamber, drive means having a shaft concentric with and rotatably entering said chamber through said wall, a centrifuge cylinder fixedly carried on said shaft and having a bottom drive flange and with an upwardly opening perforated peripheral wall, an open ended cylindrical fluid filter coextensively within the peripheral wall of the centrifuge cylinder, and a replaceable cylindrical basket received within said fluid filter for transportably containing said delicate substances and from which grease and the like is received through said filter and collected in the said chamber of the housing, said basket comprising a bottom with at least one aperture therethrough displaced from the center of rotation, there being a complementary lug projecting upwardly from the bottom of said drive flange and driveably disengagable through said aperture.

2. The extractor as set forth in Claim 1 wherein the open ended fluid filter is a replaceable sleeve contiguous to and slideable into and out of position within the peripheral wall of the centrifuge cylinder.

3. The extractor as set forth in Claim 1 wherein the open ended fluid filter is a replaceable sleeve of closely spaced filaments contiguous to and slideable into and out of position within the peripheral wall of the centrifuge cylinder.

4. The extractor as set forth in Claim 1 wherein the open ended fluid filter is a replaceable sleeve of screening contiguous to and slideable into and out of position within the peripheral wall of the centrifuge cylinder.

5. A centrifugal extractor for removing fluid from whole bodies of delicate substances and including: a vertical housing with a diametrically disposed wall forming an upwardly opening fluid collecting chamber, drive means having a shaft concentric with and rotatably entering said chamber through said wall, a centrifuge cylinder fixedly carried on said shaft and having a bottom drive flange and with a perforated peripheral wall extending upwardly therefrom, and a replaceable cylindrical basket received within said centrifuge peripheral wall for transportably containing said delicate substances and comprising a bottom with at least one aperture therethrough displaced from the center of rotation, there being a complementary lug projecting upwardly from the bottom of said drive flange and driveably disengageable through said aperture.

6. The centrifugal extractor as set forth in Claim 5 wherein there are diametrically opposite disengageable apertures and drive lugs.

7. The centrifugal extractor as set forth in Claim 5, wherein there is a plurality of diametrically opposite apertures through the basket bottom arranged in a concentrically symmetrical pattern, and wherein there is a pair of complementary lugs on the drive flange diametrically spaced to disengage through said apertures.

8. The centrifugal extractor as set forth in Claim 5, wherein the bottom of the basket is comprised of right angularly related and spaced elements arranged in a concentrically symmetrical pattern forming a plurality of spaced apertures, and wherein there is a pair of complementary lugs on the drive flange diametrically spaced to disengage through said diametrically spaced apertures.

9. The centrifugal extractor as set forth in Claim 5 wherein the drive lug is headed to engageably overlie the bottom flange of and for captured engagement of the basket bottom in the centrifuge cylinder.

10. The centrifugal extractor as set forth in Claim 5, wherein the drive lug is headed substantially smaller than the said aperture to overlie the bottom flange and basket bottom for captured engagement of the basket in the centrifuge cylinder.

11. The centrifugal extractor as set forth in Claim 5 wherein the drive lug is headed substantially smaller than the said apertures and with circumferentially opposite downwardly faced shoulders to engageably overlie circumferentially opposite edges of the aperture through the basket bottom for captured engagement of the basket in the centrifuge cylinder.

12. The centrifugal extractor as set forth in Claim 5, wherein the bottom of the basket is comprised of angularly related and spaced elements arranged in a concentrically symmetrical pattern forming a plurality of spaced apertures, and wherein there is a pair of complementary drive lugs having heads substantially smaller than the said apertures and with circumferentially opposite downwardly faced shoulders to engageably overlie circumferentially opposite edges of the apertures through the basket bottom for captured engagement of the basket in the centrifuge cylinder.

13. A centrifugal extractor for removing fluid grease and the like from whole bodies of delicate substances and including: a vertical housing with a diametrically disposed wall forming an upwardly opening fluid collecting chamber, drive means having a shaft concentric with and rotatably entering said chamber through said wall, a centrifuge cylinder fixedly carried on said shaft and having a bottom drive flange and with a perforated peripheral wall extending upwardly therefrom, a fluid filter coextensive within the peripheral wall of the centrifuge cylinder and comprising a bottom with at least a pair of apertures therethrough displaced from the center of rotation, there being a complementary pair of spaced lugs projecting upwardly from the bottom of said drive flange and disengageable through said diametrically spaced apertures in the fluid filter, and means heating the housing to a temperature maintaining fluidity of said grease and the like received through said filter and collected in said chamber of the housing.

References Cited

UNITED STATES PATENTS

| 3,063,564 | 11/1962 | Smith et al. | 210—78 |
| 3,496,016 | 2/1970 | Siepe et al. | 210—179 |
| 3,568,838 | 3/1971 | Appelgren et al. | 210—179 |

CHARLES N. HART, Primary Examiner

F. F. CALVETTI, Assistant Examiner

U.S. Cl. X.R.

210—186, 238, 380